(12) United States Patent
Nanri et al.

(10) Patent No.: US 6,632,156 B2
(45) Date of Patent: Oct. 14, 2003

(54) METHOD OF CONTROLLING CONTINUOUSLY VARIABLE TRANSMISSION

(75) Inventors: Takehiko Nanri, Saitama (JP); Kazuhiro Yasuda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/821,072

(22) Filed: Mar. 30, 2001

(65) Prior Publication Data

US 2001/0036881 A1 Nov. 1, 2001

(30) Foreign Application Priority Data

Mar. 31, 2000  (JP) ........................................ 2000-099455

(51) Int. Cl.⁷ .............................................. F16H 61/40
(52) U.S. Cl. ............................ 477/68; 477/52; 477/118
(58) Field of Search ........................... 477/52, 68, 118; 60/448, 463

(56) References Cited

U.S. PATENT DOCUMENTS

| | | | | |
|---|---|---|---|---|
| 4,913,005 A | * | 4/1990 | Ishikawa et al. | 477/68 |
| 4,938,101 A | * | 7/1990 | Maki et al. | 60/446 |
| 4,941,371 A | * | 7/1990 | Koyama et al. | 475/76 |
| 4,951,468 A | * | 8/1990 | Sasajima et al. | 251/129.05 |
| 4,956,972 A | * | 9/1990 | Sasajima et al. | 477/68 |
| 4,961,315 A | * | 10/1990 | Ishikawa et al. | 477/68 |
| 4,962,679 A | * | 10/1990 | Ishikawa et al. | 477/68 |
| 4,976,169 A | * | 12/1990 | Sasajima et al. | 477/52 |
| 5,001,900 A | * | 3/1991 | Sasajima et al. | 477/68 |
| 5,014,574 A | * | 5/1991 | Sasajima et al. | 477/68 |
| 5,101,689 A | * | 4/1992 | Yamaguchi et al. | 474/28 |
| 5,166,877 A | * | 11/1992 | Ishikawa et al. | 477/68 |
| 5,754,428 A | * | 5/1998 | Ishikawa | 477/37 |
| 5,933,795 A | * | 8/1999 | Schottler et al. | 702/145 |

FOREIGN PATENT DOCUMENTS

| | | |
|---|---|---|
| JP | A61153057 | 7/1986 |
| JP | B2527199 | 6/1996 |

* cited by examiner

*Primary Examiner*—Christopher P. Schwartz
*Assistant Examiner*—Devon Kramer
(74) *Attorney, Agent, or Firm*—Birch, Stewart, Kolasch & Birch, LLP (57) ABSTRACT

A static hydraulic continuously variable transmission includes a fixed capacity swash type hydraulic pump and a variable capacity swash type hydraulic motor, connected by a hydraulic closed circuit. A control system and method controls hydraulic pressure in the variable transmission, and thereby reduces the likelihood of noise in the variable transmission under certain driving conditions. The hydraulic pressure is controlled by changing the inclination angle of a movable swash plate. The driving conditions which prompt the control system may include: (1) A signal voltage of a throttle sensor indicates the throttle opening is lower than a first threshold value; (2) A vehicle speed is over a second threshold value; (3) An acceleration is over a third threshold value; (4) An engine speed is below a fourth threshold value; and (5) Conditions (1) through (4) last for a predetermined period of time.

17 Claims, 8 Drawing Sheets

METHOD OF CONTROLLING CONTINUOUSLY VARIABLE TRANSMISSION

BACKGROUND OF THE INVENTION

1. Field of the Invention

The present invention relates to an automatic transmission for a vehicle. More particularly, the present invention relates to a hydrostatic continuously variable transmission in which a fixed capacity hydraulic pump and a variable capacity hydraulic motor are connected by a hydraulic closed circuit.

2. Description of the Relevant Art

Hydrostatic continuously variable transmissions are well-known. Such transmissions are applied to various vehicles, such as motorcycles. A hydrostatic continuously variable transmission is described in detail in Japanese Patent Laid-Open No. Hei 61-153057. In the hydrostatic continuously variable transmission, the constant-displacement swash plate hydraulic pump and the variable-displacement swash plate hydraulic motor are connected by the hydraulic closed circuit. The constant-displacement swash plate hydraulic pump is driven by the engine to produce hydraulic pressure. Power transmission is assured by applying the hydraulic pressure to a plunger on the variable displacement swash plate hydraulic mocor side, and also by changing the angle of the swash plate pressed against the plunger on the motor side.

Japanese Patent No. 2527199 describes a control method for a static hydraulic continuously variable transmission, in which an actual rotation speed (Ne) of a crankshaft, or the like, is compared with a target rotational speed (Ne), which has been determined in accordance with predetermined conditions, and an output is controlled by adjusting an inclination angle of a swash plate.

The prior art suffers several drawbacks. The transmission makes a noise because of its construction, under certain driving conditions. The noise occurs under the following two conditions: during forward downhill drive in REVERSE gears after uphill drive, and during backward downhill drive in FORWARD gears after an engine stop occurring during uphill drive (also during backward downhill drive in REVERSE gears after an engine stop occurring during uphill drive with gears in REVERSE).

Under the above-described driving conditions, the noise occurs when an excess play exists between the plunger and the swash plate. The excess play occurs because when the output shaft is turned reversely, a hydraulic pressure is built up in the hydraulic motor, and the amount of oil being delivered to the hydraulic motor side increases with an increase in the speed of reverse rotation. The hydraulic pump on the input side is being operated with the engine idling through a one-way clutch mounted between the hydrostatic continuously variable transmission and the engine. Therefore, if the speed of reverse rotation of the output shaft increases, the hydraulic pump remains operating at the idling speed. However, the hydraulic motor comes to require more oil, and consequently the hydraulic pump will fail to deliver a sufficient amount of oil to the hydraulic motor. Under these circumstances, the pressure to be applied to the plunger of the hydraulic pump will decrease, causing the excess play and noise to occur between the plunger and the swash plate.

In the case of normal rotation (e.g., during engine brake application on a downhill), the hydraulic pump speed also increases with an increase in the speed of rotation of the output shaft. Therefore, the specific amount of oil to be delivered from the hydraulic pump is insured, producing no noise. Therefore, it is desired to prevent the occurrence of a hydraulic pressure in the hydraulic motor for the purpose of noise prevention during such reverse rotation of the output shaft. Furthermore, it is undesirable to operate this type of hydraulic equipment in such a manner as to build up a hydraulic pressure in the hydraulic motor, when no power is being supplied to the hydraulic pump.

SUMMARY OF THE INVENTION

It is an object of the present invention to provide a variable transmission and a method of controlling a variable transmission to solve one or more of the drawbacks associated with the background art.

In a first aspect of the invention concerning the method of controlling the continuously variable transmission, the constant-displacement swash plate hydraulic pump and the variable-displacement swash plate hydraulic motor are connected by the hydraulic closed circuit, and the gear ratio is changed by changing the swash plate angle. The method of controlling the hydrostatic continuously variable transmission is characterized in that, when the output shaft of the continuously variable transmission is reversely turned by the turning force from the vehicle wheel, the angle of the swash plate on the hydraulic motor side is changed to change the gear ratio to a TOP side.

A second aspect of the invention is characterized in that the constant-displacement swash plate hydraulic pump and the swash plate hydraulic motor are connected by the hydraulic closed circuit, and the swash plate angle is changed to change the gear ratio. In the second aspect of the method of controlling the hydrostatic continuously variable transmission, when the engine power entering the continuously variable transmission is shut off, the swash plate angle on the hydraulic motor side is changed to change the gear ratio to the TOP side.

According to the first aspect, when the output shaft of the continuously variable transmission is reversely turned by the turning force from the vehicle wheel, the gear ratio is changed to the TOP side by changing the angle of the swash plate on the hydraulic motor side. In this state, the swash plate on the hydraulic motor side is at right angles with the axis of the output shaft, and therefore no hydraulic pressure is built up in the hydraulic motor, thereby preventing a noise occurrence. One advantage of the present invention is that this improvement can be realized by making a change to the method of control, and that additional structural components are not needed.

According to the second aspect, if the input of the engine power to the hydraulic pump side during an engine stop is interrupted, the swash plate on the hydraulic motor side is positioned to the TOP side, producing no hydraulic pressure on the hydraulic motor side. It is therefore possible to prevent an occurrence for this type of hydraulic equipment, wherein hydraulic pressure is built up in the hydraulic motor, when no power is being supplied to the hydraulic pump.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more filly understood from the detailed on given hereinbelow and the accompanying drawings which are given by way of on only, and thus, are not limitative of the present invention, and wherein.

DETAILED DESCRIPTION OF THE INVENTION

Figure 1:
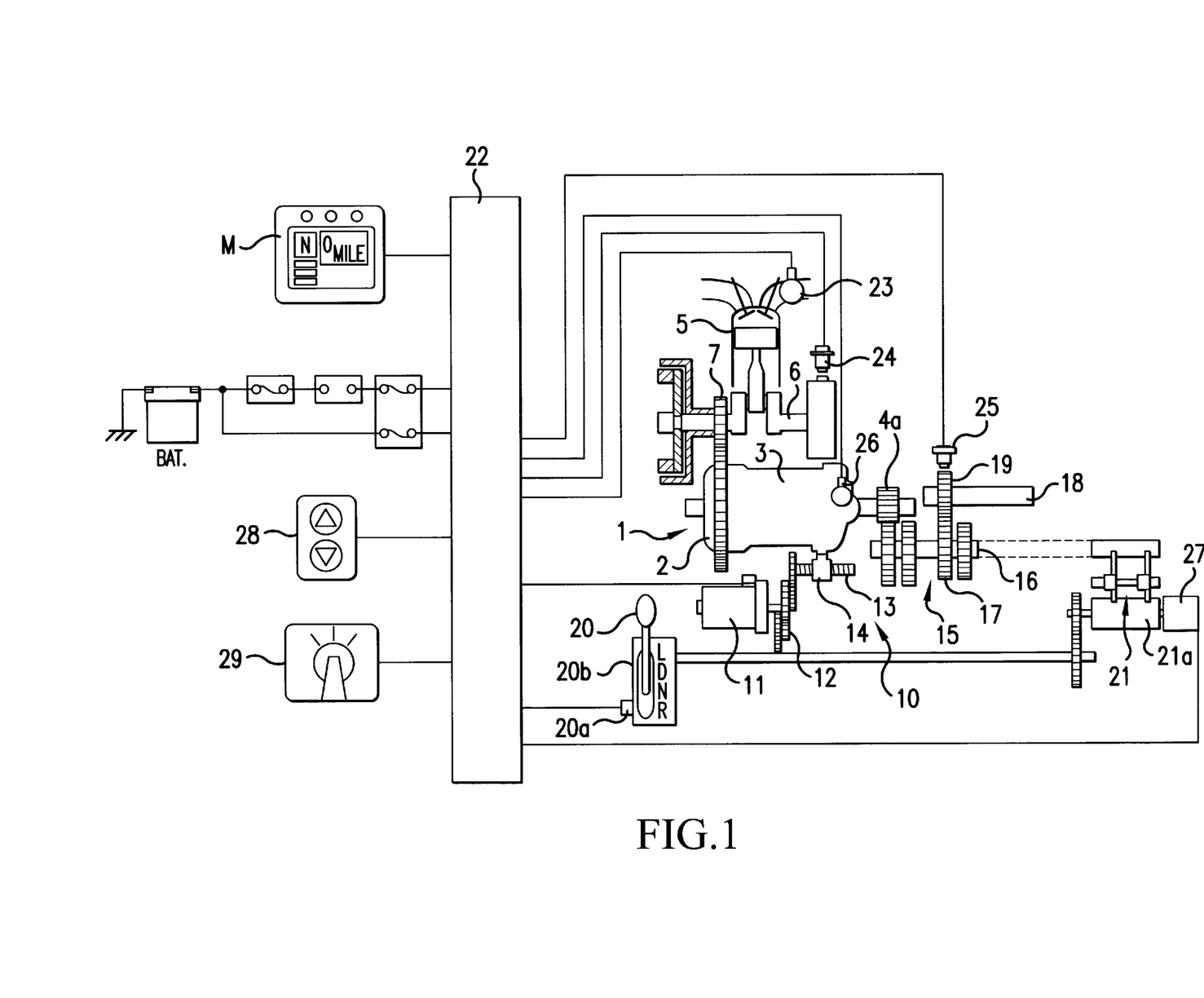
FIG. 1 illustrates a control system, in accordance with the present.

Referring to FIG. 1, a hydrostatic continuously variable transmission 1 comprises a fixed capacity hydraulic pump 2 and a variable capacity hydraulic motor 3 integrally provided on a drive shaft 4, with the fixed capacity hydraulic pump 2 and the variable capacity hydraulic motor 3 being connected by a hydraulic closed circuit. A drive gear 7 provided on a crankshaft 6 of an engine 5 rotates a driven gear 8 of the fixed capacity hydraulic pump 2, thereby providing hydraulic pressure thereto. This hydraulic pressure rotates the variable capacity hydraulic motor 3 at a variable speed, which transmits a changed output to the drive axle 4. A gear ratio can be arbitrarily changed by the inclination angle control mechanism 10 that changes an inclination angle of the movable swash plate (to be described later) of the variable capacity hydraulic motor 3.

The inclination control mechanism 10 transmits the output of a control motor 11 via a linkage system, including a reduction gear 12, and changes the inclination angle of the movable swash plate built into the variable capacity hydraulic motor 3 through a threaded rod and follower, such as a ball screw 13 and a slider 14. The transmission output of the hydrostatic continuously variable transmission 1 is transmitted from an output gear 4a of the drive axle shaft 4 to a sub gear train 15, being a secondary reduction gear train. A transmission output of sub gear train 15 is transmitted from an output gear 17 on a transmission shaft 16 to a final output gear 19 on a final output shaft 18.

The sub gear train 15 is switched by manually operating a sub-transmission lever 20 mounted on a drive range change-over switch 20b to drive a shifter 21, so that each shift position of L or D on the forward side, reverse R, or neutral N can be selected. The range L is for driving at low speed, the range D is for driving at normal or ordinary speed, N is for neutral, and R is for reverse driving. When the shift position R is selected, the gear ratio is fixed at a LOW ratio (e.g., a ratio of transmission output/input is relatively lower).

Each of the L and D shift positions on the forward side can be switched to various drive modes (to be described later) by a mode map switch 29 provided on a steering handle. The drive modes roughly comprise an automatic shift mode and a multi-stage variable transmission mode. When the variable transmission is selected, shift-up and shift-down can be manually performed by operating a shift switch 28 provided on the handle.

Figure 7:
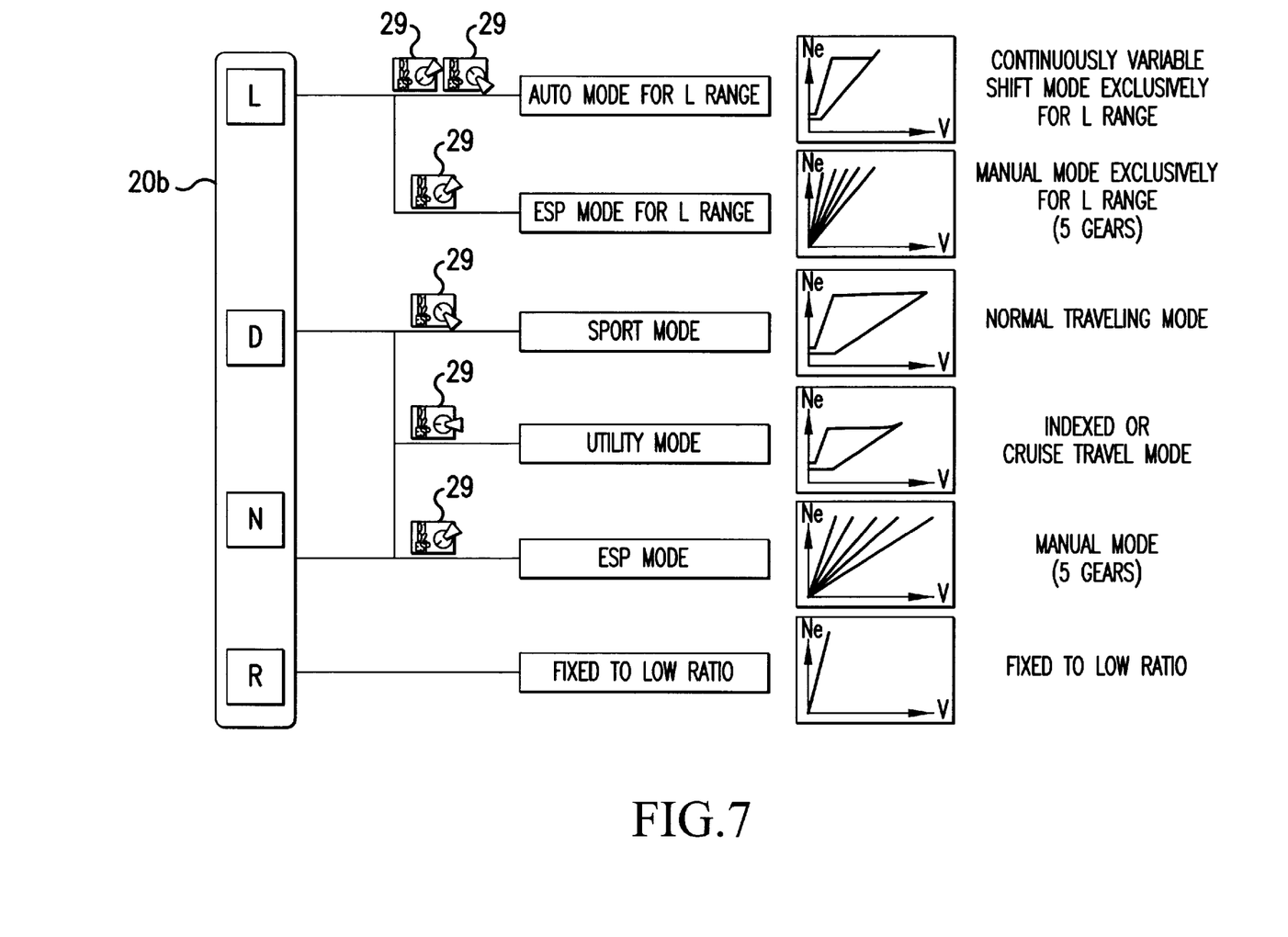
FIG. 7 is a diagram of various modes.

FIG. 7 describes predetermined drive modes. When the L range is selected by the sub-transmission lever 20, the mode map switch 29 is switched to D1 or D2, and a mode is changed to an L range auto mode of the continuously variable transmission mode dedicated to the L range. Further, when the mode map switch 29 is switched to ESP, the mode is changed to an L range ESP mode of the manual mode dedicated to the L range, enabling manual change of 5 gears on the forward side.

When the D range is selected, the mode map switch 29 is switched to D1, and a sports mode suitable for normal driving is selected. When the mode map switch 29 is switched to D2, a utility mode suitable for pulling trailers or cruising is selected. When switched to ESP, the manual mode for normal driving is adopted, in which it is possible to manually change 5 gears on the forward side.

In the continuously variable transmission and multi-stage variable transmission, the gear ratio is actually changed by inclination angle control. The inclination angle control is performed by a control unit 22, which controls the operation of the control motor 11 of the inclination angle control mechanism 10, based on signals from various sensors. In addition, the control unit 22 outputs display signals to indicators of an instrument panel M, and is provided with power from a battery on the vehicle.

As shown in the FIG. 1, the control unit 22 receives for the inclination control mechanism 10 the following signals, which are a throttle angle signal from a throttle sensor 23 mounted on the intake side of the engine 5, an Ne signal from a rotation sensor 24 located near the crankshaft 6, a vehicle speed signal from a speed sensor 25 located near the final output gear 19, an inclination angle signal from an angle sensor 26 provided at the variable capacity hydraulic motor 3, shift position signals from a shift sensor 27 integrated with a shift drum 21a of a shifter 21 so as to detect shift positions, and signals from the shift switch 28 and mode map switch 29 provided in the steering wheel. Further, the control unit 22 receives a signal from a lever switch 20a located at the lower part of a sub-transmission lever 20 of the drive range change-over switch 20b.

Figure 2:
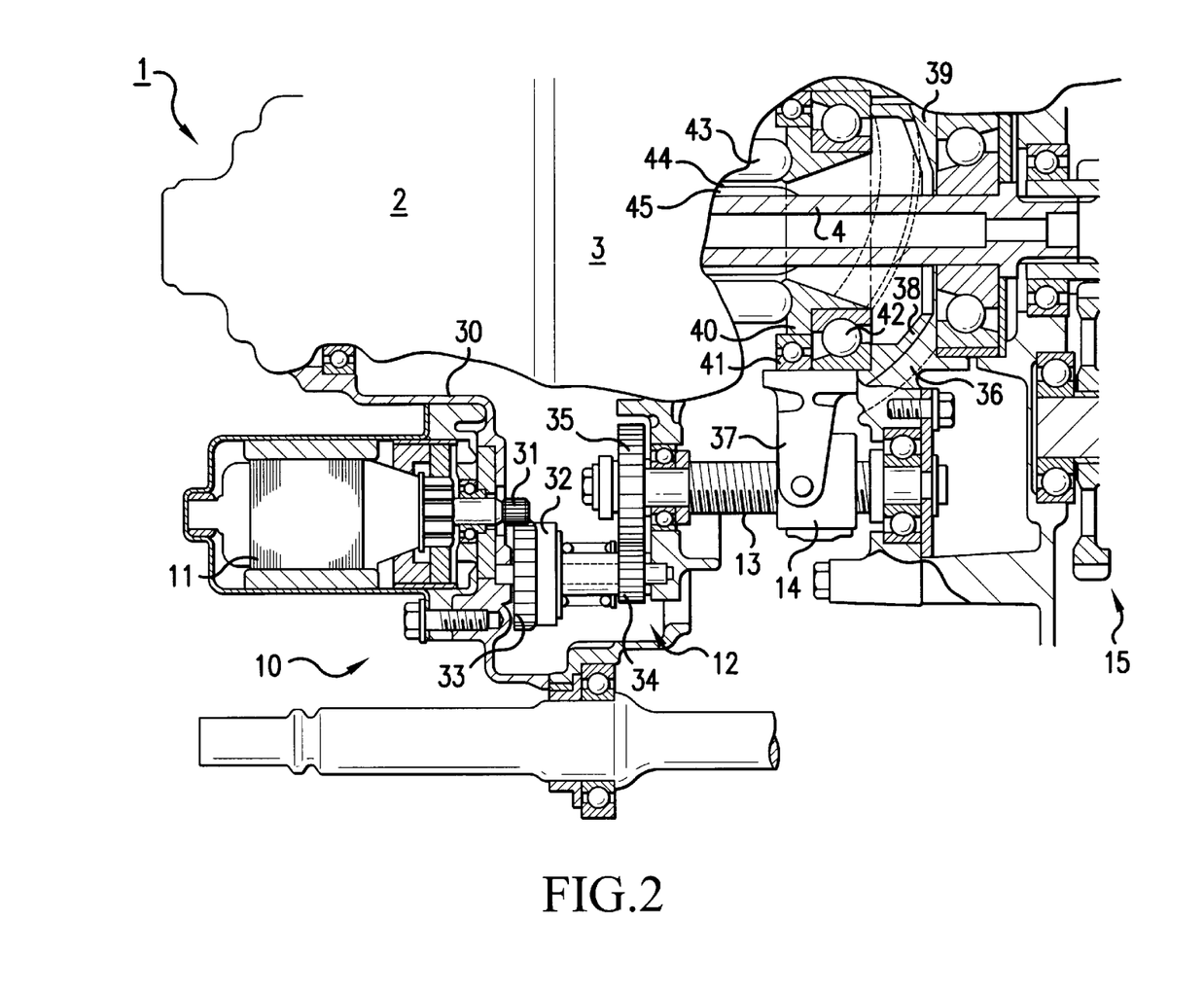
FIG. 2 is a partial cross sectional view illustrating mechanical components for inclination angle control of a movable swash plate, in a hydrostatic continuously variable transmission.

Next, a description is given of the inclination angle control mechanism 10 shown in FIG. 2. The control motor 11, of the inclination angle control mechanism 10, is supported by a housing 30 of the fixed capacity hydraulic pump 2. An output of the control motor 11 is transmitted to a ball screw drive gear 35 from a gear 34 through an input gear 33 of a torque limiter 32. The input gear 33 is driven by an output gear 31 of the control motor 11. The ball screw drive gear 35 rotates together with the ball screw 13. As the ball screw 13 rotates forward or backward, the slider 14 having a nut slides on the shaft in either direction. Both ends of the ball screw 13 are supported by a housing 36 of the hydraulic motor 3.

An arm 37 extending from the housing 36 has one end thereof rotatably attached to the slider 14, and the other end thereof integrated with a swash plate holder 38 supported in the housing 36. The swash plate holder 38 is rotatably supported on a concave surface 39 of the housing 36. When the arm 37 rotates, the swash plate holder 38 also rotates on the concave surface 39 and changes the angle of the movable swash plate 40.

The movable swash plate 40 is rotatably held against the inner side of the swash plate holder 38 via bearings 41 and 42, and by varying the angle of the swash plate holder 38, the inclination angle formed between a rotation surface of the movable swash plate 40 and the axis of the drive shaft 4 is altered. FIG. 2 illustrates an angle of 90°, which is a TOP state where the gear ratio is 1.0.

Hydraulic plungers 43 of the variable capacity hydraulic motor 3 are pressed against this movable swash plate 40. A plurality of hydraulic plungers 43 are provided in a peripheral direction of a rotating body 44, and are pushed out so as to press against the variable swash plate 40 side by the hydraulic pressure at the fixed capacity hydraulic pump 2 side. Rotational force is supplied to the rotating body 44 according to the inclination angle of the variable swash plate 40. The rotating body 44 is fitted on the drive shaft 4 using a spline joint 45, and the drive shaft 4 is driven to rotate by rotation of the rotating body 44.

Figure 3:
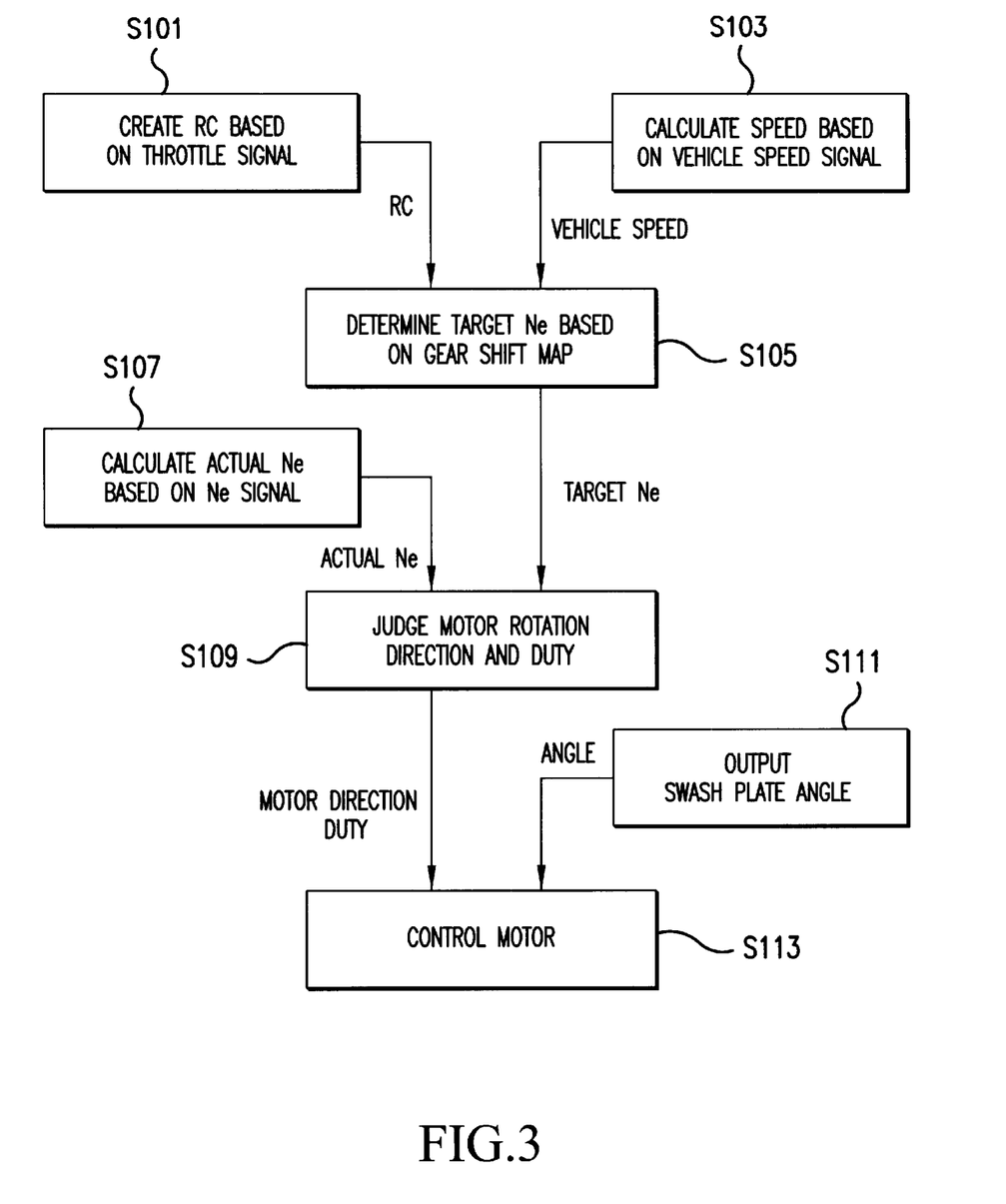
FIG. 3 is a flowchart of a continuously variable transmission control method.

Next, gear shift control for a continuously variable transmission in the control unit 22 will be described using FIG. 3. In step S101, RC (riding conditions) are created from a throttle signal sent from the throttle sensor 23. RC basically increases or decreases in accordance with the value of the throttle signal:

(1) When the throttle is opened, RC increases;
(2) When the throttle is closed, RC decreases.

Figure 4:
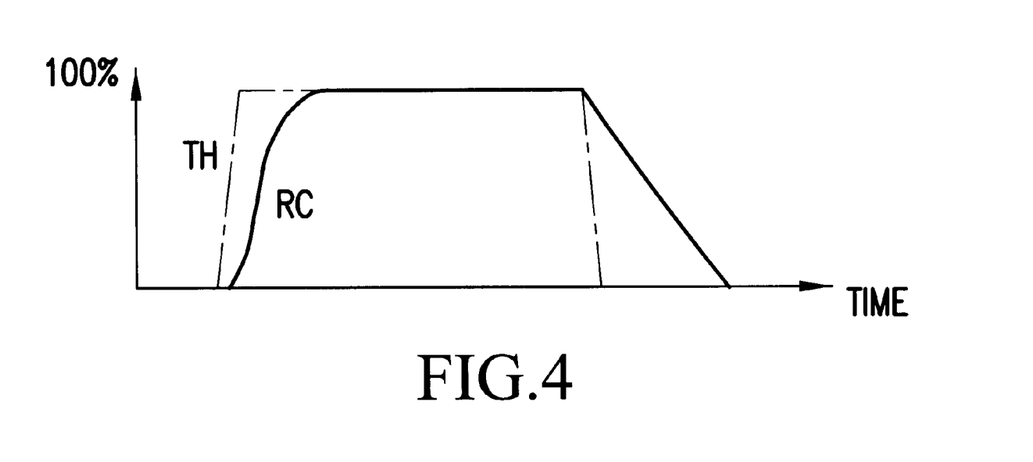
FIG. 4 is a graph used in determining RC (riding conditions)

FIG. 4, TH stands for a throttle opening amount. The vertical axis represents the throttle opening amount and RC (each given as a %). The horizontal axis represents time.

Figure 5:
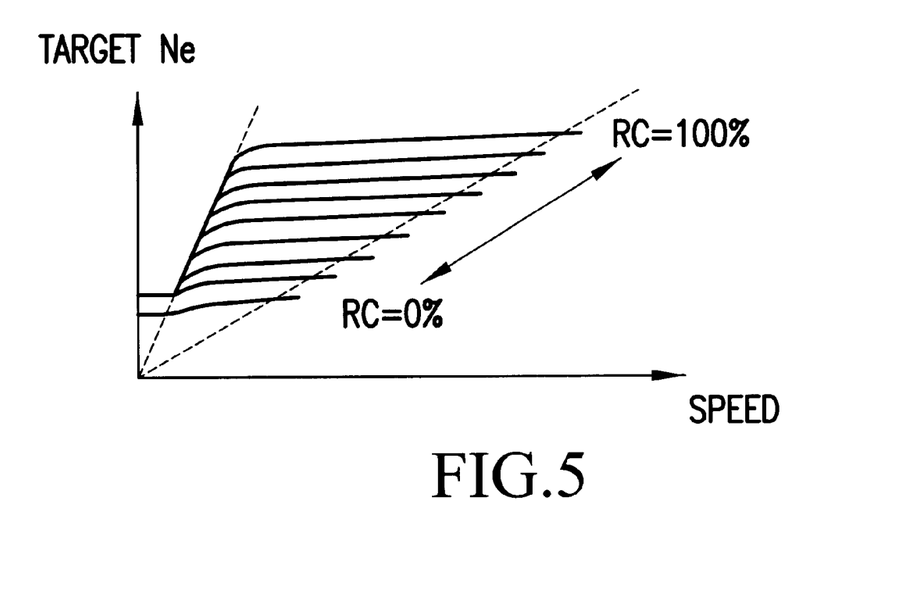
FIG. 5 is a graph illustrating a gear shift map.

In step S103, vehicle speed is calculated separately from a vehicle speed signal sent from the throttle sensor 25. Following, in step S105, a target Ne (e.g., rotation sped) is determined with reference to a previously built-in or stored gear shift map, based on the RC and the vehicle speed. One example of a gear shift map is shown in FIG. 5, in which a predetermined number of types have been prepared. For example, various modes such as L range exclusive, sports mode exclusive, utility mode exclusive etc. are stored, and these can be selected using the mode map switch 29.

In step S107, actual Ne is calculated from a Ne signal sent from the rotation sensor 24. In step S109, the actual Ne and the target Ne are compared, and it is determined whether the rotation direction of the control motor 11 should be forward or reverse, and DUTY is determined. Specifically, a determination is made for the movement direction of the movable swash plate as described in the following:

actual Ne>target Ne→movable swash plate is moved toward the TOP side;
actual Ne<target Ne→movable swash plate is moved toward the LOW side.

Duty is also determined from the following equation:

$$\text{DUTY} = K1 \times \text{actual } Ne - \text{target } Ne \text{ (where K1 is a coefficient)}$$

Here, duty represents a proportion or level of current flowing in the control motor 11, and is used in speed control of the control motor 11. With DUTY at 100% the control motor 11 is at maximum speed, while with DUTY at 0% the motor is stopped.

In step S113, the control motor II is controlled based on a rotation direction of the motor and a movable swash plate angle calculated based on DUTY and an angle signal from the angle sensor 26 (as determined in step S111). Specifically, the control motor 11 is driven using motor rotation direction and DUTY, each of the LOW and TOP ratios are measured using the movable swash plate angle, and at the time of disconnection from the TOP ratio, the control motor 11 is stopped.

In this embodiment, stepped gear shift control is possible using a stepped gear shift mode. Stepped gear shift control means gear shift control that can manually shift a gear ratio, such as a many stepped transmission, as if it were a continuously variable transmission. This type of stepped gear shift control is carried out by controlling an inclination angle of the movable swash plate 40 under control of the control unit 22 in the same way as for the case described up to now, but in this case it is sufficient to only change the control method so as to carry out stepwise gear shifting.

Switching between this type of stepped gear shift mode and the automatic gear shift mode is carried out by a mode switch 29, and a stepped gear shift operation when in stepped gear shift mode is carried out by pressing the shift switch 28. The shift switch 28 is provided with a shift up button and a shift down button, and each time one of these buttons is pressed the gears are shifted up or shifted down by one stage.

Figure 6:
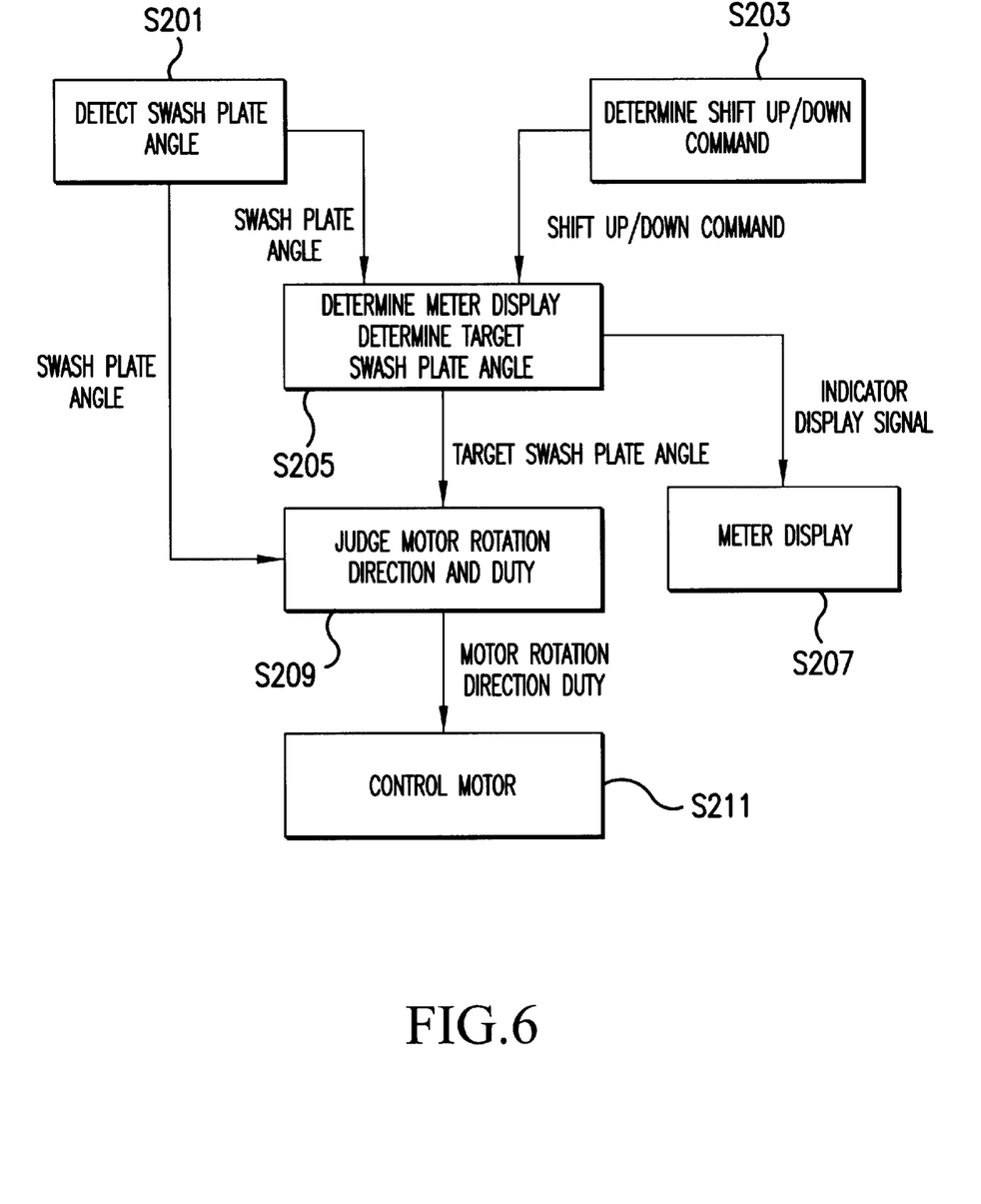
FIG. 6 is a flowchart of a multi-stage variable transmission control method.

FIG. 6 shows a control procedure of the control unit 22 for stepped gear shift control. In step S201, an inclination angle is calculated from the swash plate inclination angle signal from the angle sensor 26. In step S203, a shift command making the operation content shift up or shift down is determined using a shift signal from the shift switch 28. This determination sets a shift up command if the shift up button of the shift switch 28 is pressed, or sets a shift down command if the shift down button of the shift switch 28 is pressed.

In step S205, a meter display determination and a target swash plate angle are determined based on the above described inclination angle and shift command. The meter display determines a number of gear stages, which corresponds to a number of shift stages of a manual transmission, using the inclination angle. Next, the meter display determines a display signal to go to an indicator of the meter M, and outputs this signal to the meter M. In step S207, the determined number of gear stages is displayed on the meter M.

Determination of the target inclination angle for the swash plate 40 is established under the following conditions, with respect to a current gear display signal, when there is input of a shift command:

shift up command→single stage shift up
shift down command→single stage shift down Following that, in step S209, the target swash plate angle (determined in step S205) is compared with the inclination angle (S201), and based upon the comparison the forward or reverse rotation direction of the control motor 11 and DUTY are determined from the following:

inclination angle>target swash plate angle→shift movable swash plate 40 toward the LOW side;
inclination angle<target swash plate angle→shift movable swash plate 40 toward the TOP side.

DUTY is determined from the following equation:

$$\text{DUTY} = K2 \times |\text{inclination angle} - \text{target swash plate angle}| \text{ (where K2 is a coefficient)}$$

Next, in step S211, the control motor 11 is drive controlled based on the motor rotation direction and the DUTY, to incline or decline the movable swash plate 40 to a specified angle. In this way, the hydrostatic continuously variable transmission 1 can carry out stepped gear shifting, which is corresponds to a stepped gear shifting of a manual multi-stepped transmission.

Figure 8:
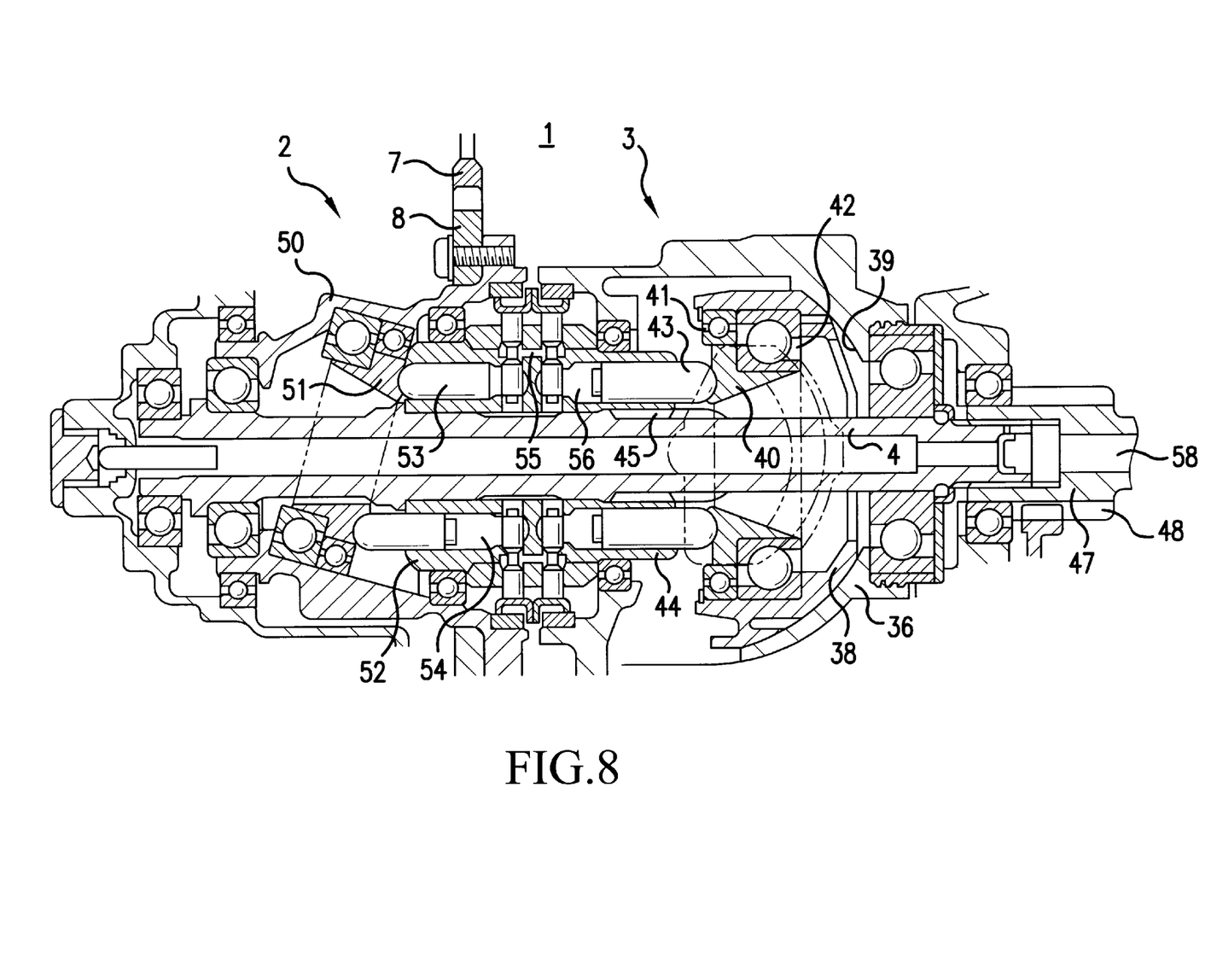
FIG. 8 is a cross sectional view of the hydrostatic continuously variable transmission.

FIG. 8 is a cross sectional view schematically showing the general structure of the hydrostatic continuously variable transmission 1. In the constant-displacement hydraulic pump 2, the driven gear 8 is attached integrally with a rotating housing 50. The fixed swash plate 51 rotates as one body with the rotating housing 50. With the rotation of the fixed swash plate 51, a pump-side plunger 53 (axially protruding from the side of the rotor 52 disposed on the coaxial extension of the driving shaft 4 and facing the fixed swash plate 51) moves back and forth. The back and forth movement produces a hydraulic pressure in the plunger chamber 54. The hydraulic pressure is supplied to a closed hydraulic circuit 55.

The closed hydraulic circuit 55 communicates with a plunger chamber 56 provided in a rotor 44 on the variable-displacement hydraulic motor 3 side on the same axis as the driving shaft 4. This communication causes the hydraulic pressure produced at the constant-displacement hydraulic pump 2, supplied to the plunger 43 on the motor side, to press the plunger 43 against the movable swash plate 40, thereby turning the rotor 44 on the driving shaft 4.

The rotor 44 is connected by the spline 45 on the axis side with the driving shaft 4 so that the rotor 44 can rotate as one body with the driving shaft 4. The angle of the movable swash plate 40 is variable, as described later. Changing the swash plate angle causes the rotor 44 to turn at a varied speed, which is outputted to the driving shaft 4.

Figure 9:
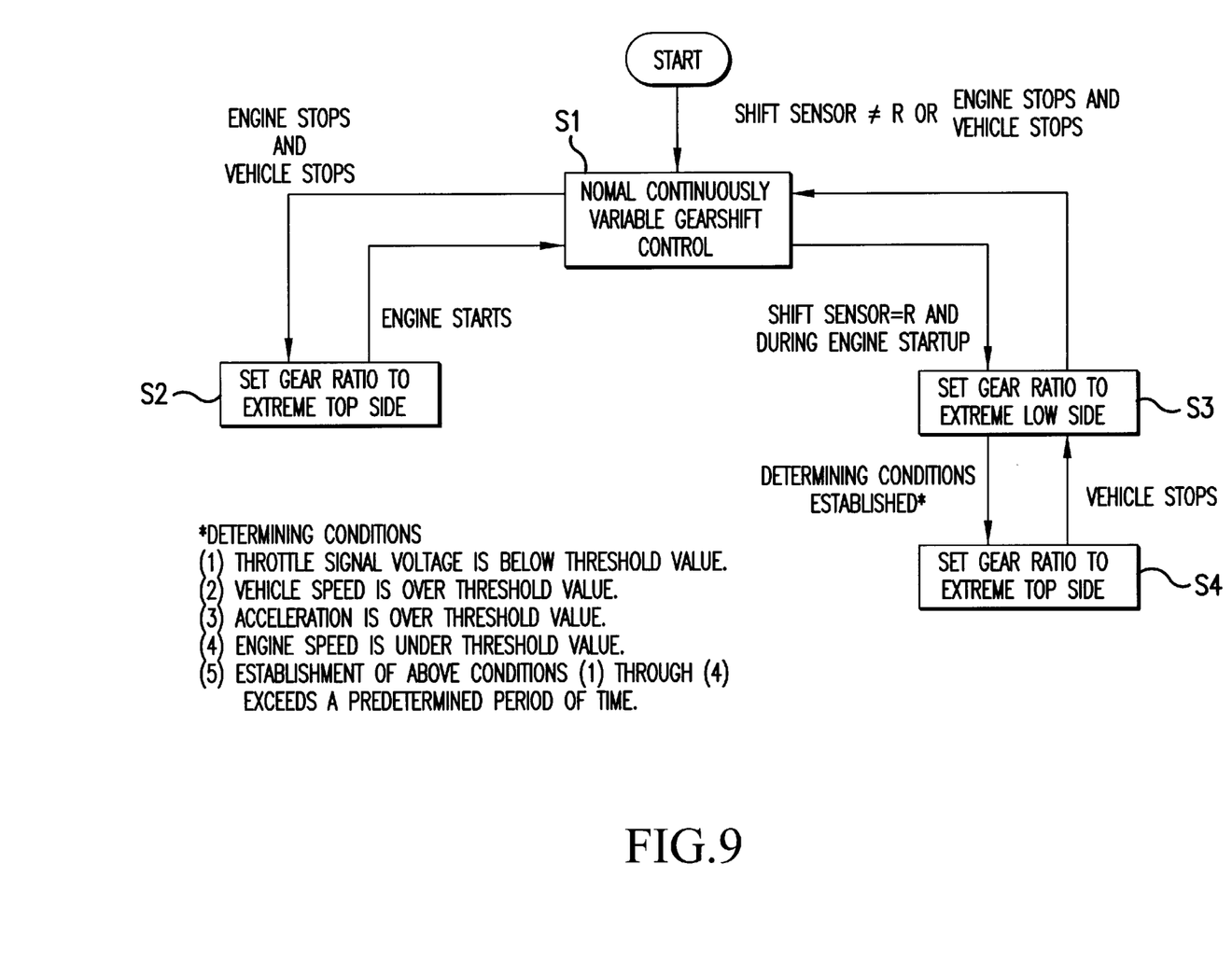
FIG. 9 is a diagram illustrating control states.

FIG. 9 is a diagram illustrating various control states concerning noise occurrence reduction control. The diagram illustrates how the occurrence of noise is reduced according to two conditions of noise occurrence. In step S1, after starting the engine, ordinary continuously variable gearshift control or ordinary multi-step gearshift control is performed.

In step S2, if the engine or the vehicle is stopped, the gear ratio is changed to a TOP side (with the movable swash plate 40 perpendicular to the axis of the drive shaft 4). Thereafter, the gear ratio is changed back (step S1), when the engine is restarted. This manner of operation prevents an undesirable operation to this type of hydraulic equipment, such as when a hydraulic pressure is produced in the hydraulic motor 3 when no power is supplied to the hydraulic pump 2.

As illustrated in the control diagram of FIG. 9, step S3 concerns when the control is changed from normal driving to REVERSE (e.g. the shift sensor 27 is switched to the R range for reversing the vehicle) and during engine startup. In step S3, the gear ratio is changed to a LOW side for ordinary REVERSE control. While in this state (step S3), noise occurrence reduction control determining conditions are monitored. When the determining conditions are satisfied or established, the gear ratio is changed to the TOP side in step S4. This state occurs at such times as when the driving shaft 4 is reversed for forward downhill driving, still in REVERSE after uphill driving in REVERSE, etc.

The determining conditions, which trigger processing passing to step S4 for noise reduction control, are:

(1) The signal voltage of the throttle sensor 23, indicating an amount of throttle opening, is lower than a first threshold value;

(2) The signal voltage of the speed sensor 25, indicating the vehicle speed, exceeds a second threshold value;

(3) Acceleration, computed from a change in the vehicle speed, exceeds a third threshold value;

(4) The signal voltage of the speed sensor, indicating the engine speed, is lower than a fourth threshold value;

(5) The establishment of conditions (1) through (4) exists for a period of time exceeding a fifth threshold value.

Each threshold value of the above conditions is determined by testing. The threshold values are chosen so as to indicate the occurrence of a driving condition wherein the rotor 44 is reversely turned by the driving shaft 4 at a higher speed than the hydraulic pump 2 driven with the engine idling. Without the control algorithm of this invention, a hydraulic pressure will be built up, resulting in an excess play between the pump-side plunger 53 of the hydraulic pump 2 and the fixed swash plate 51. The excess play will result in noise.

In the present invention however, even if the driving shaft 4 is turned reversely by the vehicle wheel, no hydraulic pressure will be produced. No hydraulic pressure is produced since the sliding surface of the movable swash plate 40, on which the hydraulic plunger 43 slides, is set in its TOP position (at right angles with the driving shaft 4). Therefore, there will be no excess play between the pump-side plunger 53 (of the hydraulic pump 2 driven at the engine idling speed) and the fixed swash plate 51. It is, therefore, possible to reduce or prevent noises likely to occur under special driving conditions because of the construction of the hydrostatic hydraulic continuously variable transmission 1.

Thereafter, when the vehicle is stopped, the determining conditions will vary, returning to step S3. Furthermore, if the shift sensor 27 is positioned, by the sub-gearshift lever 20, in other than the R position, in which REVERSE control can not be made, or in case the engine stops or the vehicle stops, the control procedure goes back to step S1. The REVERSE position may be solely detected by the use of a REVERSE switch 20a (FIG. 1). Alternatively, the REVERSE position may be detected by the shift sensor 27, either alone or in combination with the switch 20a. The REVERSE switch 20a is mounted at the base of the sub-gearshift lever 20, and is designed to be ON when the lever 20 is in the R range.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of controlling a hydrostatic continuously variable transmission, which includes a fixed capacity hydraulic pump and a variable capacity hydraulic motor connected by a hydraulic closed circuit, wherein a gear ratio of the variable transmission is changed by altering a swash plate angle, said method comprising the steps of:

sensing an input power to the variable transmission; and
if the input power is less than a predetermined level, altering the angle of the swash plate, wherein said step of altering the angle of the swash plate includes altering the swash plate angle, such that an output/input gearing ratio of the variable transmission is changed to a TOP side, wherein the swash plate is perpendicular to an axis of a drive shaft extending therethrough.

2. The method according to claim 1, wherein said step of altering the angle of the swash plate includes altering the swash plate angle, such that an output/input gearing ratio of the variable transmission is increased.

3. The method according to claim 1, wherein the input power being less than the predetermined level is indicative of the input power being shut off.

4. A method of controlling a hydrostatic continuously variable transmission, which includes a fixed capacity hydraulic pump and a variable capacity hydraulic motor connected by a hydraulic closed circuit, wherein a gear ratio of the variable transmission is changed by altering a swash plate angle, said method comprising the steps of:

sensing rotations of an output shaft of the variable transmission; and if the output shaft of the variable transmission is reversely turned by a turning effort from a vehicle wheel, altering the angle of the swash plate, wherein said step of altering the angle of the swash plate includes altering the swash plate angle, such that an output/input gearing ratio of the variable transmission is changed to a TOP side, wherein the swash plate is perpendicular to an axis of a drive shaft extending therethrough.

5. The method according to claim 4, wherein said step of altering the angle of the swash plate includes altering the swash plate angle, such that an output/input gearing ratio of the variable transmission is increased.

6. A method of controlling a hydrostatic continuously variable transmission, which includes a fixed capacity hydraulic pump and a variable capacity hydraulic motor connected by a hydraulic closed circuit, wherein a gear ratio of the variable transmission is changed by altering a swash plate angle, said method comprising the steps of:

sensing when a vehicle is put into a reverse driving condition;

while in the reverse driving condition, moving the swash plate to a LOW side wherein an output/input ratio of the variable transmission is relatively low; and monitoring for specific vehicle conditions, and altering the angle of the swash plate upon the occurrence of the vehicle conditions.

7. The method according to claim 6, further comprising providing a throttle position sensor, and wherein the specific vehicle conditions include the throttle position sensor indicating that an amount of throttle opening is less than a threshold value.

8. The method according to claim 6, further comprising providing a vehicle speed sensor, and wherein the specific vehicle conditions include the vehicle speed sensor indicating that a vehicle speed exceeds a first threshold value.

9. The method according to claim 8, wherein the specific vehicle conditions further include a vehicle acceleration exceeding a second threshold value.

10. The method according to claim 6, further comprising providing an engine speed sensor, and wherein the specific vehicle conditions include the engine speed sensor indicating that an engine speed is less than a threshold value.

11. The method according to claim 6, further comprising:

providing a throttle position sensor, a vehicle speed sensor, and an engine speed sensor; and wherein the specific vehicle conditions include:
condition (1) the throttle position sensor indicates that an amount of throttle opening is less than a first threshold value;
condition (2) the vehicle speed sensor indicates that a vehicle speed exceeds a second threshold value;
condition (3) a vehicle acceleration exceeds a third threshold value; and
condition (4) the engine speed sensor indicates that an engine speed is less than a fourth threshold value.

12. The method according to claim 11, wherein said step of altering the angle of the swash plate occurs only when conditions (1), (2), (3) and (4) exist simultaneously for at least a predetermined time.

13. The method according to claim 12, wherein said step of sensing when a vehicle is put into a reverse driving condition includes sensing a position of a driver's shift lever.

14. The method according to claim 11, wherein said step of sensing when a vehicle is put into a reverse driving condition includes sensing a position of a driver's shift lever; and sensing a gear position of a shiftable sub-transmission.

15. The method according to claim 6, wherein said step of sensing when a vehicle is put into a reverse driving condition includes sensing a position of a driver's shift lever.

16. The method according to claim 6, wherein said step of sensing when a vehicle is put into a reverse driving condition includes sensing a gear position of a shiftable sub-transmission.

17. The method according to claim 6, wherein said step of sensing when a vehicle is put into a reverse driving condition includes sensing a position of a driver's shift lever; and sensing a gear position of a shiftable sub-transmission.

* * * * *